United States Patent
Dunne et al.

[15] 3,654,613
[45] Apr. 4, 1972

[54] PROGRAMMED MANIPULATOR APPARATUS WITH ARTIFICIAL END-OF-PROGRAM FACILITIES

[72] Inventors: Maurice J. Dunne; George E. Munson, Jr., both of Newtown, Conn.

[73] Assignee: Unimation, Inc., Bethel, Conn.

[22] Filed: Feb. 11, 1970

[21] Appl. No.: 10,379

[52] U.S. Cl..........................340/172.5, 214/1 B, 235/151.11
[51] Int. Cl.........................................G06f 15/46, B25j 9/00
[58] Field of Search..........................340/172.5; 235/151.11; 214/1 B, 1 CM, 11, 1; 209/72, 121; 219/79, 124

[56] References Cited

UNITED STATES PATENTS

| | | | |
|---|---|---|---|
| 2,988,237 | 6/1961 | Devol, Jr. | 214/11 |
| 3,051,328 | 8/1962 | Brown et al. | 214/1 |
| 3,346,848 | 10/1967 | Viret et al. | 340/172.5 |
| 3,306,442 | 2/1967 | Devol | 209/121 |

Primary Examiner—Raulfe B. Zache
Attorney—Mason, Kolehmainen, Rathburn & Wyss

[57] ABSTRACT

A programmed manipulator apparatus is provided with partial program repetition teaching facilities so that a predetermined portion of the total program may be repeated a selectable number of times after which the total program is performed. The point at which the partial program is to be repeated is employed to develop an artificial end-of-program signal which is employed to restart the total program. Counter means are provided for disabling the artificial end-of-program signal after a number of repetitions of the partial program. The manipulator apparatus is also arranged to cooperate with an externally produced artificial end-of-program signal which may be responsive to the presence or absence of a part carried by the manipulator arm, a characteristic such as the temperature of the part carried by the arm, or the like, and is employed to restart the total program if an undesired characteristic is sensed.

15 Claims, 8 Drawing Figures

INVENTORS:
MAURICE J. DUNNE
GEORGE E. MUNSON JR.
BY Mason, Kolehmainen
Rathburn & Wyss
ATTORNEYS

PROGRAMMED MANIPULATOR APPARATUS WITH ARTIFICIAL END-OF-PROGRAM FACILITIES

The present invention relates to programmed manipulator apparatus and, more particularly, to programmed manipulator apparatus which is capable of automatically repeating a portion of the total programmed movement of the manipulator arm in response to an artificially produced end-of-program signal.

Various types of programmable manipulator apparatus have been heretofore employed in which a manipulator arm may be taught to move through a programmed series of steps and may thereafter be controlled automatically to carry out the programmed steps in repetitive cycles during which work is performed on a part held by the manipulator arm. For example, the manipulator arm may operate in cooperation with a die-casting machine to remove finished hot parts from the machine and place them on a conveyor. In the alternative, the manipulator arm may remove hot billets from a furnace, move them into a press to be molded or stamped, and then remove the finished part from the press and place it in a suitable receptacle.

In many instances it is desirable to modify movement of the manipulator arm so that a portion of the total programmed movement of the arm is repeated a number of times before the remaining portion of the total program is carried out. For example, in the case of operation with a die-casting machine it is many times desirable to have the manipulator arm remove several parts from the machine and deposit them on a conveyor and then have the manipulator arm move to a lubrication gun stand, take up a lubricating gun, carry it to the die-casting machine and lubricate both parts of the die, and then return the lubricating gun to the gun stand whereupon the manipulator arm may again carry out a number of further partial programs in which a part is removed from the die-casting machine.

It is, likewise, desirable in many instances to control the manipulator apparatus from an externally developed signal in such manner that the manipulator arm is returned to the first step of the program even though the total program has not been carried out. Thus, in the case of an operation in which the manipulator arm removes hot billets from a furnace and carries them to a press, the hot billets should not cool down too rapidly or else they will not be suitable for proper operation with the press. It would, therefore, be desirable to have an intermediate heat sensing station at which point the temperature of the part carried by the manipulator arm is measured and if the billet is too cool it will not be carried to the press but will simply be dropped into a reject chute and the manipulator arm returned to the furnace for another hot billet without completing the total programmed series of steps.

It is, therefore, an object of the present invention to provide a new and improved programmable manipulator apparatus which is capable of repetitively carrying out a portion of the total programmed series of steps in response to an artificially produced end-of-program signal and without completing the total program.

It is another object of the present invention to provide a new and improved programmable manipulator apparatus which is provided with partial program repetition facilities for repetitively reproducing an initial portion of the total program in response to a recorded control signal and after the partial program has been repeated a selectable number of times the total program is automatically performed.

It is a further object of the present invention to provide a new and improved programmable manipulator apparatus which is capable of operating with an artificially produced end-of-program signal to return the manipulator arm to its initial position at any selectable point in the total program.

Briefly, in accordance with one aspect of the invention, a partial program repetition switch is provided which may be employed during the teaching operation to provide a control signal at any selectable point in the total program. When the program is repeated during repetitive working cycles, the control signal recorded in the channel assigned to the partial program repetition switch is employed to develop an artificial end-of-program signal which is then utilized to reset the memory drum of the manipulator apparatus back to its initial step so that only the first portion of the total program is repetitively reproduced. Counter facilities are provided for counting the number of times this partial program is repeated and after it has been repeated a predetermined number of times the artificial end-of-program signal is disabled so as to permit the manipulator arm to move throughout the entire programmed series of steps.

In accordance with a further phase of the invention, the artificial end-of-program signal may be externally developed in response to a heat-sensing device, or other facility for sensing a characteristic of the part which is carried by the manipulator arm. If the desired characteristic is not detected by the sensing means, an artificial end-of-program signal is developed which causes the manipulator arm to be returned to its initial position without completing the entire program.

The invention, both as to its organization and method of operation, together with further objects and advantages thereof, will best be understood by reference to the following specification taken in connection with the accompanying drawings in which:

Referring now to the drawings, and more particularly to the partial program repetition embodiment shown in FIGS. 1 to 6, inclusive, thereof, the programmed manipulator apparatus 40 is shown in cooperation with a die-casting machine 20, a lubrication gun stand 22 from which a lubrication gun may be taken periodically by the apparatus 40 and used to lubricate the parts of the die-casting machine 20, and a finished part conveyor 24, on which the manipulator apparatus 40 deposits the finished part after it has seized the part and removed it from the machine 20.

In accordance with the present invention the apparatus 40 is arranged automatically to remove a predetermined selectable number of parts from the machine 20 and deposit them on the conveyor 24 after which the apparatus 40 takes a lubrication gun from the stand 22, moves it to the die-casting machine 20 and sprays the parts thereof and then returns the gun to the stand 22 to complete the entire program. Movement of the apparatus 40 between the machine 20 and conveyor 24 may be referred to as a partial program and the control apparatus of the present invention is arranged to repeat this partial program a selected number of times between each lubrication operation.

The manipulator apparatus 40 is of the type described in more detail in a copending application of Maurice J. Dunne, et al. Ser. No. 808,152 filed Mar. 18, 1969 and reference may be had to said copending application for a complete description of such apparatus. For the purpose of the present invention, it may be stated that the apparatus 40 comprises a generally rectangular base or mounting platform on which the hydraulically powered manipulator arm of the apparatus is supported together with all of the hydraulic, electrical and electronic components necessary to provide five programmed articulations or degrees of freedom for the manipulator arm. Specifically, this base supports a control cabinet indicated generally at 42 within which is housed the electronic control system portion of the manipulator apparatus, said cabinet having a control panel 44 on which are located the various controls of the control system necessary to control movement of the hydraulically powered manipulator arm in both an initial so-called teaching mode and in a repeat mode in which the manipulator arm is moved in repetitive cycles through a sequence of movements in each of the five axes as programmed during the teaching operation.

The hydraulically powered manipulator arm comprises a boom assembly indicated generally at 50, which is pivotally mounted for movement about a horizontal axis and is tilted to give a down-up motion of the outer end of the manipulator arm.

The boom assembly 50 includes a pair of hollow extendable arm portions 68 and 70 which are arranged to be moved as a unit in and out of the corresponding portions of the boom assembly 50 by means of an out-in hydraulic cylinder 72, the outer ends of the tubes 68, 70 being secured to a crosshead assembly 74. The crosshead assembly 74 carries a forwardly projecting hand portion to which is connected a pneumatically operated clamping device indicated generally at 80, commonly called a hand assembly, which is provided with opposed grasping fingers arranged to grasp any desired object.

Figure 1:
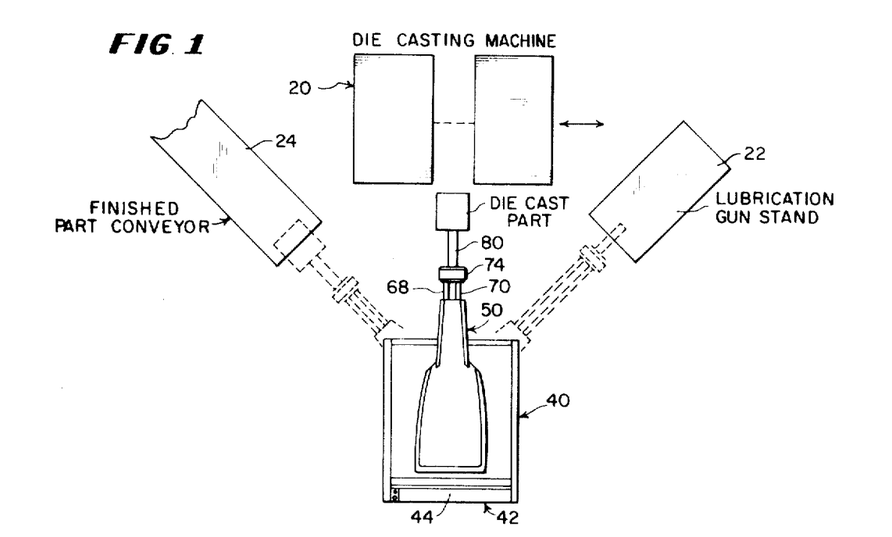
FIG. 1 is a plan view of a programmed manipulator apparatus which operates in conjunction with external die-casting apparatus in accordance with features of the present invention.

As stated heretofore, in the embodiment of FIG. 1, the clamping device 80 is arranged to grasp a finished part in the die-casting machine 20, after which the manipulator arm is moved to a point above the conveyor 24 whereupon the device 80 is released and deposits the finished part on this conveyor.

The hand assembly 80 is arranged to be moved in two different axes independently of movement of the boom assembly 50. More particularly, this assembly 80 is arranged to be rotated about the pivotal axis of the crosshead assembly 74, this movement being referred to as wrist bend or simply bend.

In addition, the assembly 80 is arranged to be rotated about its longitudinal axis so as to produce a rotation of the hand assembly 80 about the central longitudinal axis of the boom assembly 50, this motion being referred to as wrist swivel or simply swivel.

Figure 2:
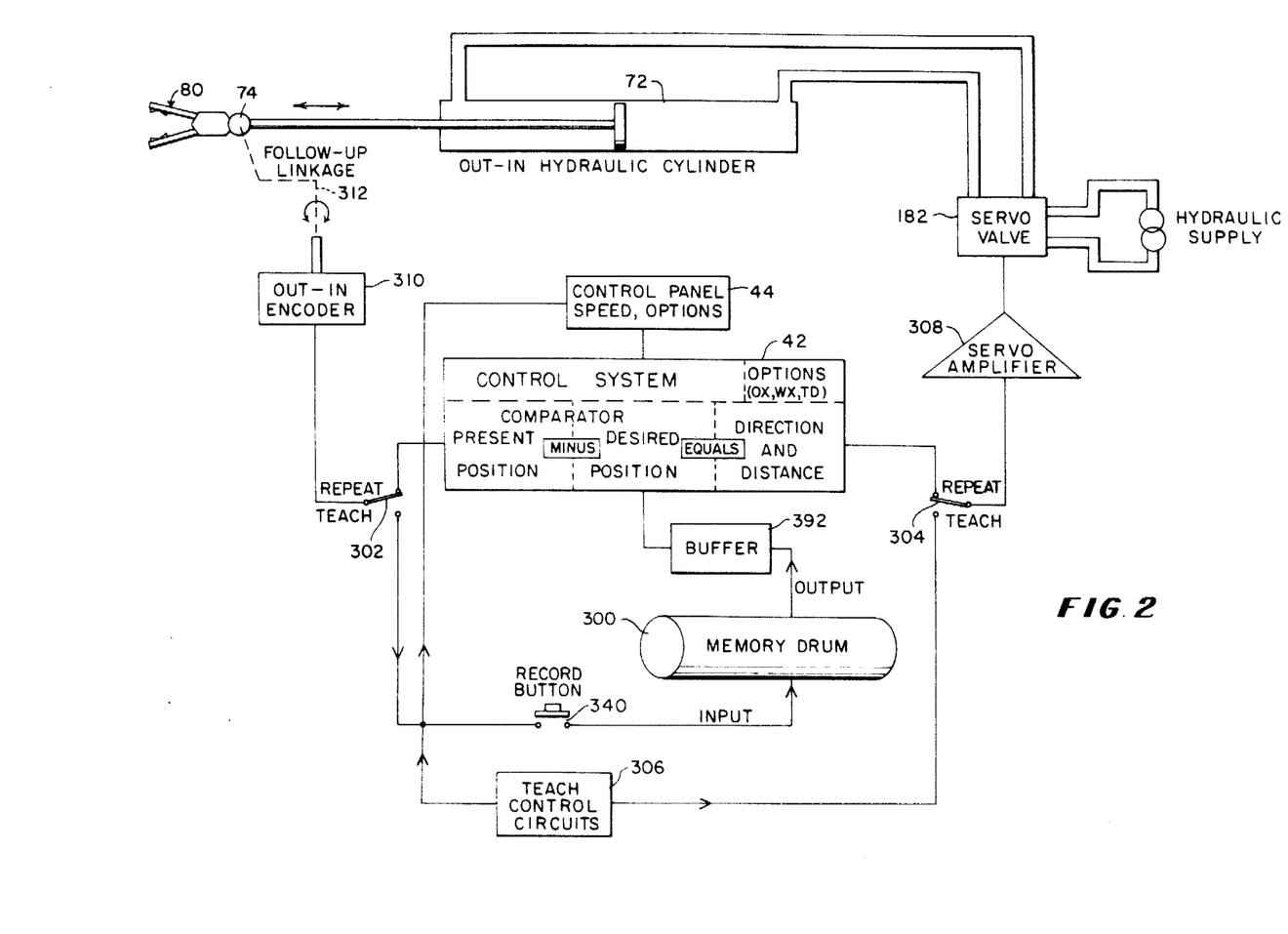
FIG. 2 is a basic block diagram of the electronic control portion of the manipulator apparatus of FIG. 1.

Considering now the control system portion of the manipulator apparatus 40, reference is made to FIG. 2 wherein the basic components of the control system are shown in block diagram form in conjunction with one controlled axis, the out-in axis, of the manipulator apparatus. The control system includes a continuously rotating memory drum 300 in which digital information may be stored relative to three different programs each consisting of a number of program steps up to a maximum of 60 steps in each program. The control system of the manipulator apparatus has two basic modes of operation. The first mode is a so-called teach mode in which the hydraulically powered manipulator arm is moved to the series of successive positions to which the arm is to be successively moved during repetitive working or repeat cycles. Each time that the manipulator arm is moved to a new position this position is recorded on the memory drum 300, together with associated auxiliary signals relating to how that particular program step is to be carried out. To this end, a pair of teach-repeat switches 302, 304 are provided. When the switches 302, 304 are thrown to the teach position, the teach control circuits 306 are connected to the input of the servo amplifier 308 which controls the out-in servo valve 182.

The teach control circuits 306 include suitable voltage sources for moving the manipulator arm in all five axes, as well as controls relative to the accuracy with which the arm is to be moved to the desired position, the operation of the hand clamp air cylinder, and other functions. Also, as stated heretofore, the control circuits 306 include a partial program teach switch 52 (FIG. 3) which may be employed to designate any particular step in the total program as a partial program repeat position at which the drum 300 is reset to its initial program step, as will be described in more detail hereinafter.

The signal supplied to the out-in servo amplifier 308 opens the valve 182 by an amount determined by the amplitude of this signal so that the hydraulic cylinder 72 moves the hand assembly in the desired direction along the out-in axis. For purposes of illustration, the servo valve 182 is shown in FIG. 2 as having bi-directional outputs to the out-in hydraulic cylinder 72. However, it will be understood that with reference to the particular cylinder 72, the rod side of the cylinder is supplied with system pressure rather than through the servo valve 182, as has been described in more detail heretofore. The resulting pressure on the piston of the cylinder 72 moves the hand assembly 80 in or out, depending upon the polarity of the electrical signal developed by the teach control circuit 306.

In order to provide digital information representing the absolute position of the arm and hand assembly in each of the five controlled axes of movement thereof, there is provided a series of digital encoders, one for each controlled axis. More particularly, an out-in encoder 310 is mounted at the rear end of the boom assembly 50, behind the hydraulic cylinder 72 and is mechanically interconnected with the crosshead assembly 74 by means of a follow up linkage 312 so that as the hand assembly 80 is moved along the radial or out-in axis a digital signal is developed by the encoder 310 which represents the absolute position of the hand assembly in this axis in digital form. In a similar manner digital encoders are provided for the other four controlled axes of the manipulator apparatus. Each of these encoders 310, etc. is preferably of the type shown in a copending application of George Hamlin Leonard, Ser. No. 494,524 filed Oct. 11, 1965, now U.S. Pat. No. 3,525,094 in order to provide a high degree of accuracy of the digital information developed by the encoder while at the same time providing for relatively long distances of travel in each of the five controlled axes. While reference may be had to said copending Leonard application for a complete and detailed description of such encoders, it may be stated generally that such an encoder comprises a pair of code-bearing discs which are geared together so as to advance continuously at different ratios in accordance with the mechanical input signal. The successive code combinations of the two discs are continuously sensed, each code member contributing its part to a composite code combination. The high speed code member rotates one revolution in the course of a single code-combination advance of the low speed code member. An arrangement is provided for insuring accurate transfer of information from one bit to the next on the low speed disc during a change in the high speed code member from one code bit at the completion of one code cycle to the next code bit at the start of the next code cycle. By employing combinational codes derived from both high speed and low speed discs, large digital numbers and hence large distances of movement in each axis may be measured by the encoders, while providing high accuracy digitized output signals. The encoder for a particular axis will develop a digital signal having a number of digits corresponding to the movement which is to be made in that axis and the degree of accuracy required therein. For example, the encoder 310 may develop a 10 bit digital signal.

Referring again to the teach mode of operation of the control system, when the hand assembly 80 has been moved to the desired position, the encoder 310 continues to develop a digital output signal representing this final position of the hand assembly in the out-in axis. The manipulator arm and hand assembly is also positioned in the other four axes of movement so that the hand assembly is in a desired final position and orientation to which it is to be moved during a repeat cycle. The digital signals which are continuously produced by the encoders associated with each axis and supplied through the switch 302 to one side of a normally open record button 340. In addition, certain other signals are supplied to the record button 340 from the teach control circuits 306, and also from the control system as set up on the control panel 44, which indicate other functions which are to be performed in conjunction with movement of the manipulator arm to the desired position. The record button 340 is then depressed and supplies all of these signals to the memory drum 300, so that the information represented thereby is recorded on the memory drum 300 at a desired position corresponding to the particular program step which is being taught. Preferably, the digital signals which are developed by the encoders such as the encoder 310, are in reflected binary code, as distinguished from standard binary code, for the reason that the reflected binary signal is one in which only one digit changes between successive numbers in the code.

After the record button 340 is released the teach control circuits 306 are actuated so as to move the hand assembly 80 to a new position by energization of those ones of the hydraulic cylinders in each axis which must be changed from the previously programmed position. When the next position is reached, the record button is again depressed so as to record the new digital information for each axis at the new program step area of the memory drum 300. This sequence of operations is carried out until the manipulator arm has been moved to the last desired position at which point an end-of-program bit is recorded in the memory drum 300 along with information relating to the last program step.

After a complete program consisting of a number of positions to which the manipulator hand is to be moved in succession has been recorded in the memory drum 300, the repeat-teach switches 302 and 304 are thrown to the repeat position. In this position the output of the encoders, such as the encoder 310, are supplied to a comparator portion of the control system and the desired position in each axis is sensed from the memory drum 300 and stored in a buffer storage unit 392. The comparator compares, in each axis, the encoder signal with the memory drum command signal and derives both a direction signal signifying the direction in which the hand should be moved to reduce the error, and a distance signal corresponding to the difference between the encoder signal representing the actual position of the hand assembly 80 and the desired position as stored in the memory drum. In the illustrated out-in axis, these signals are supplied by way of the switch 304 to the servo amplifier 308 which controls the servo valve 182 so that the cylinder 72 moves the hand assembly in the correct direction to reduce the error signal to zero or to some programmed magnitude of error signal. When final coincidence is obtained in all axes of the apparatus, the next programmed step is read from the memory drum 300, is compared with the various encoders in each axis and the corresponding error signals are employed to drive the corresponding hydraulic cylinders to the next programmed point in each axis. When the manipulator arm is moved to the last programmed position the end-of-program bit is employed to restart the programmed series of operations so that the manipulator arm repetitively moves through the taught series of motions during repetitive work cycles and until the apparatus is turned off.

Figure 3:
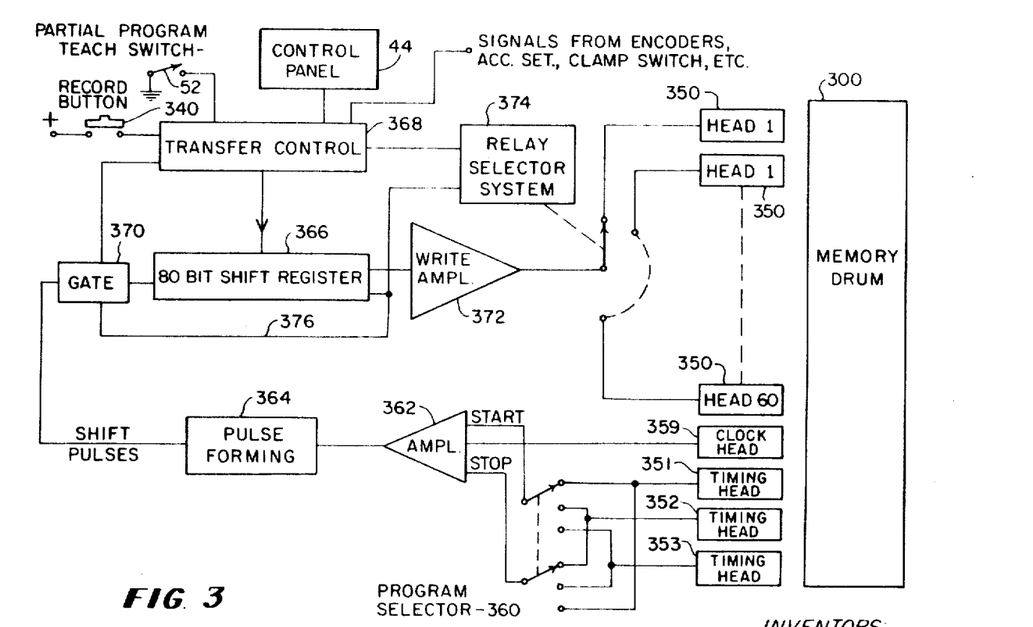
FIG. 3 is a more detailed block diagram of the system of FIG. 2 shown in the teach mode of operation wherein a partial program repetition signal is taught.

Referring now to FIG. 3, the control system of the manipulator apparatus is shown therein in somewhat more detailed block diagram form in conjunction with all five axes of movement and illustrates the manner in which the memory drum is programmed during the teaching mode of operation. The memory drum 300 is provided with a series of 60 read-write heads 350 which are spaced along the length of the memory drum 300 and may be employed as either write heads during the teaching operation or as read heads during the repeat mode of operation of the apparatus. In order to increase the versatility of the manipulator apparatus, the memory drum 300 is arranged so that three different programs may be stored within the memory drum 300, any one of these programs being selected from the control panel 44 of the apparatus in accordance with a master control program or by manual selection. More specifically, the periphery of the drum is divided so that a program one interval is provided for the first third of a drum revolution, a program two interval is provided during the second third and a program three interval during the final third of each drum revolution. The end points of each of the program intervals are defined by word tracks which are permanently recorded in the memory drum 300 and occur once each revolution at the desired staggered intervals to define the desired program intervals. A series of three timing heads 351, 352 and 353 are provided to sense these word tracks.

The clock pulses which are selectively transmitted to the amplifier 362 are supplied to a pulse forming circuit 364 and are then employed as shift pulses which are supplied to an 80 bit shift register 366. In the illustrated embodiment, each program interval includes 80 clock pulses so that 80 bits of information may be recorded along one-third of the periphery of the memory drum 300 during one step of a particular selected program interval. The encoders 310 and 324 associated with the out-in and swivel axes develop 10 bit code numbers, the encoders 314 and 322 associated with the down-up and bend axes develop 11 bit numbers, and the rotary encoder 326 develops a 13 bit number. Accordingly, 55 information bits are required to record all five positions of these encoders. In addition, other auxiliary functions may be selected by the teach control circuits and the control panel 44 and recorded in the memory drum at a particular program step so as to cause the manipulator apparatus to perform auxiliary functions in conjunction with a particular step. These auxiliary functions may include a signal generated by closure of a partial program teach switch 52 at any particular step in the total program which is utilized by the partial program repetition circuit described hereinafter.

Considering now the actual operation of the manipulator apparatus in recording a particular program step during a teaching operation, the hand assembly is moved to a desired position which is thereafter continuously represented by the digital output of the encoders in each axis. When the arm and hand assembly has been precisely positioned in each axis and the desired auxiliary functions described above, such as the partial program teach function, have been set up in the transfer control apparatus 368, the record button 340 is depressed and all of the encoder output signals, auxiliary signals and option signals are transferred in parallel to the 80 bit shift register 366. When this transfer is completed, a signal is supplied to an input gate circuit 370 which permits shift pulses to be applied to the 80 bit shift register 366 so that the digital information which has been transferred to the register 366 is serially supplied through a write amplifier 372 to a particular one of the heads 350 under the control of a relay selector system 374. Assuming that the selector system 374 is set to supply the recording signal to the first one of the heads 350, the first step in the selected program interval will then be recorded on the memory drum 300. The final output from the shift register 366 is then supplied over the conductor 376 to turn off the gate 370. The end of register pulse is also supplied to the selector system 374 so as to cause the write amplifier 372 to be connected to the next one of the heads 350.

In a similar manner, the teach controls 306 are again selectively actuated to bring the hand assembly 80 to a new position so that new digital information is available from each encoder and this information is again recorded as the second step in the selected program by depressing the record button 340. It will thus be evident that a series of up to 60 program steps may be recorded during a particular program interval, each of these program steps including the absolute position to which the hand assembly is to be moved in each axis, the speed at which such movement is to take place, the accuracy with which positioning is to be accomplished, the actuation of the hand clamping device, and finally in association with the last program step an indication that the end of the program has been reached and that the relay selector system 374 should be reset to the first program step and the cycle repeated. Also, at some particular step in the program an indication is given, by closure of switch 52, that the manipulator arm is to repeat that portion of the program a number of times before completing the entire program. For example, at the step where the arm deposits the finished part on the conveyor 24 in FIG. 1 a partial program repeat function is taught so that the arm will move between the machine 20 and the conveyor 24 a number of times and then move from the conveyor 24 to the gun stand and carry out a lubricating operation, as described generally heretofore.

Figure 4:
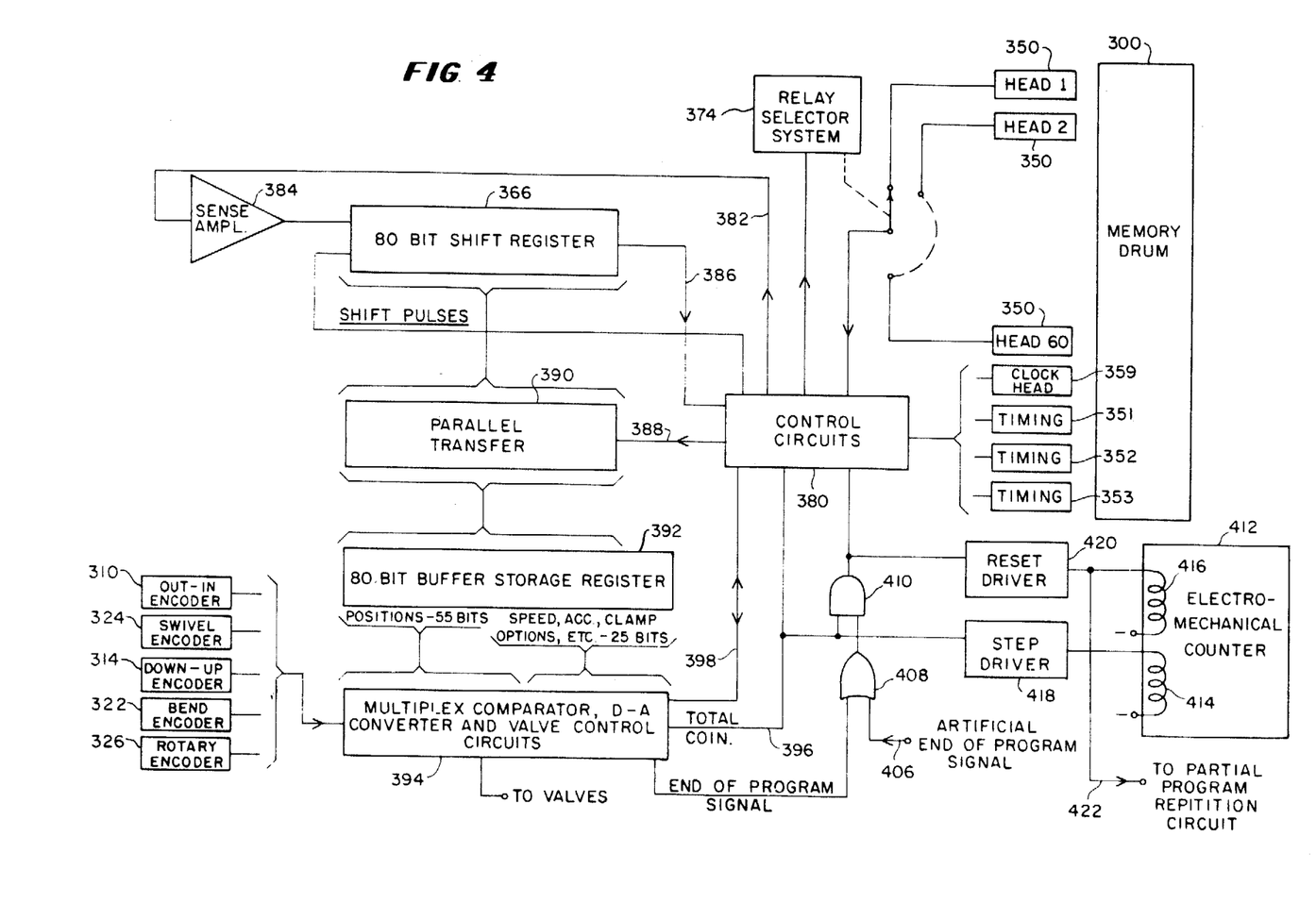
FIG. 4 is a more detailed block diagram of the system of FIG. 2 shown in the repeat mode and with provision for accepting an artificial end-of-program signal.

In FIG. 4 the operation of the manipulator apparatus in the repeat mode of operation is shown in more detailed block diagram form and in conjunction with all five axes of movement. Referring to this figure, it is assumed that the relay selector system 374 is connected to the first one of the heads 350 which is used as a read head during the repeat operation. The output of this head is sent to a group of control circuits indicated generally at 380 wherein the block and word tracks are employed to select the desired program interval and the programmed bits of information corresponding to the first recorded step of the selected program. These programmed bits are supplied over the conductor 382 to a sense amplifier 384 from which they are supplied to the 80 bit shift register 366. After the first program step information has been read into the register 366 a signal is supplied over the conductor 386 to the control circuits 380 which respond by sending a control signal over the conductor 388 to a parallel transfer circuit 390 which is interconnected between the 80 bit shift register 366 and an 80 bit buffer storage register 392 on an individual basis for each bit. Parallel transfer circuit 390 then transfers the 80 bits of information in parallel to the 80 bit buffer storage register 392 wherein they are stored until the arm and hand assembly has been moved to the position designated by the position signals stored therein. The position signals stored in the register 392 and representing the desired end points of the program step in each of the five axes, are supplied to a multiplex form of comparing arrangement indicated generally at 394 wherein the encoder signal is compared with the digital command or position signal stored in the register 392 and develops a digital error signal. This digital error signal is converted to an analog voltage which is then demultiplexed and stored both as to direction and distance, these stored signals then being supplied to the individual servo valves corresponding to each axis. The respective servo valves then function to move the corresponding hydraulic cylinder so that the encoders are moved in the direction to reduce the error signal to zero in each axis.

While this motion is taking place, the relay selector system 374 is shifted to the next read head 350 and the second step information is read into the shift register 366. When total coincidence is achieved in all five axes, a signal is developed on the conductor 396 which is supplied to the control circuits 380 which respond by sending a control signal to the parallel transfer circuits 390 over the conductor 388. The parallel transfer circuits 390 then transfer in parallel the 80 bits of information from the shift register 366 to the buffer storage register 392. The information thus stored in the register 392 becomes the new command signals for controlling the servo systems in each axis. At the same time, the relay system 374 is stepped to the next head 350 and the third step information is read into the shift register 366. In this manner the hand and arm assembly is repeatedly moved to the respective positions which have been programmed into the memory drum during the teaching operation.

The specific apparatus employed in accordance with the present invention to provide an artificial end-of-program signal in response to the control signal recorded on the memory drum 300 will now be considered. This control signal is recorded in one of the auxiliary channels of the drum 300 at the position in the total program at which partial program repetition is to be initiated. It will be recalled from the above general description of the overall control system that when the step just prior to the partial program repetition step is completed, a total coincidence signal is developed on the conductor 396 which is supplied to the control circuit 380 and has the effect of actuating the parallel transfer unit 390 to transfer in parallel all of the stored information regarding the next position, as well as other information including speed, accuracy, clamp and other options. These other options will include the channel employed for the control signal which has been impressed upon the memory drum 300 during the partial program teach operation. Accordingly, a control signal is derived from the buffer storage unit 392 at the partial program repetition step and is supplied by way of the conductor 400 to an inverting amplifier 402. The output of the inverting amplifier 402 is supplied to a second inverting amplifier 404 so that in response to the partial program teach control signal derived from the buffer storage unit 392 an artificial end-of-program signal is developed at the output of the second inverting amplifier 404. This artificial end-of-program signal is supplied by way of the conductor 406 to one input of a two input OR-gate 408 (FIG. 4), the other input of which constitutes the normal end-of-program signal derived from the buffer storage 392 in the channel assigned to the conventional end-of-program signal signifying that the total program has been completed and that the memory drum 300 should be returned to the first position of the program for repetitive work operations.

The output of the OR-gate 408 is supplied as one input of a two-input AND-gate 410 the other input of which is the total coincidence signal appearing on the conductor 396. Accordingly, it is only when a total coincidence signal appears on the conductor 396, indicating that all of the motions in the five controlled axes have been completed for the step at which partial program repetition is to be initiated, that the artificial end-of-program signal developed on the conductor 406 is effective to produce an output signal in the output of the AND-gate 410. This output signal is supplied to the control circuits 380 and has the effect of causing the control circuits 380 to shift sensing of the memory drum 300 back to the initial step of the program, i.e., the first one of the heads 350 in the series assigned to the total program on the drum 300.

As shown in FIG. 4, the manipulator apparatus is provided with an electromechanical counter, indicated generally at 412, which is preferably mounted on the control panel 44 and is provided with a stepping coil 414 and a reset coil 416. The electromechanical counter 412 is provided so that the operator of the manipulator apparatus can see, by inspection of this counter, the particular step of the program at which the manipulator arm is located. Accordingly, each time a total coincidence signal is developed on the conductor 396 when movement in all of the axes to a given position corresponding to a particular program step is completed, this total coincidence signal is supplied to a step driver 418 which develops a pulse of suitable energy level to drive the stepping coil 414 so that the electromechanical counter 412 is moved one step. The counter 412 thus provides a continuous indication of the particular step in the total program to which the manipulator arm is moving.

When the end of the program is encountered on the drum 300, the normal end-of-program signal is supplied through the OR-gate 408 and when total coincidence occurs the AND-gate 410 develops an output so that the drum 300 is reset to the first step. The output of the AND-gate 410 is also supplied to a reset driver circuit 420 which develops a pulse of suitable energy level to drive the reset coil 416 of the counter 412 so that this counter is reset to zero each time the total program is carried out. In a similar manner, when the portion of the total program up to the partial program repetition step is completed, a pulse is developed in the output of the AND-gate 410 in response to the artificial end-of-program signal on the conductor 408. This pulse is also applied to the reset driver 420 so that the reset coil 416 is energized and the counter 412 is reset to zero. This reset pulse is also supplied by way of a conductor 422 to the partial program repetition circuit of FIG. 5.

If no further control facilities were provided, the control system would continue to repeat only the designated partial program i.e. the portion of the total program from the first step to the step at which the control signal is encountered on the drum 300. However, in accordance with the present invention, a counting arrangement is employed to count the number of times the partial program has been repeated and after the partial program has been repeated a selected number of times, the artificial end-of-program signal developing means is disabled so that the manipulator arm is permitted to move through the total program recorded on the drum 300. As stated generally heretofore, this total program may include movement of the manipulator arm to perform a die lubrication operation with a lubricating gun obtained from the stand 22. More specifically, a counter in the form of a so-called predetermining counter 430 is provided, this counter being mounted on a sub panel 54, FIG. 6, which is preferably attached to or mounted on the main control panel 44 of the manipulator apparatus. The predetermining counter 430 has a stepping coil 432 which is mechanically connected through a suitable ratchet mechanism to drive the switch arm 434 in one direction to a series of different switch positions in response to the application of control pulses to the coil 432. The coil 432 is mechanically connected to the switch arm 436 in a second switching level of the counter so as to move this arm to the same switch position as the arm 434. Preferably, the predetermining counter 430 is of the type in which the number of times that the partial program is to be repeated may be manually set into the counter by depressing a button 438 located on and extending forwardly from the panel 54. Each time the button 438 is depressed a ratchet mechanism drives a switch arm 440 of a third, independent switch section of the counter 430 and also causes a corresponding numeral to appear in the upper window 442 of the counter 430. The button 438 is thus depressed a number of times equal to the desired number of repetitions of the partial program.

As the counter 430 is stepped to a different position each time a partial program is completed, a corresponding number appears in the lower window 444 of the counter 430. When the counter 430 has been stepped a number of times equal to the number set into the counter by depressing the button 438, i.e. when the numbers in the windows 442 and 444 coincide, the predetermining counter 430 is reset to zero so that the number in the lower window 440 becomes zero. At the same time, the artificial end-of-program signal is disabled so that the total program will be carried out including the portion thereof beyond the control signal at the partial program repetition step.

Figure 6:
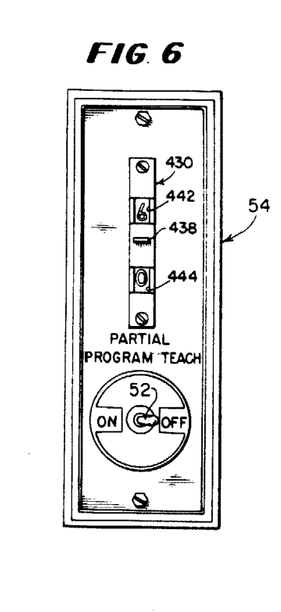
FIG. 6 is a front view of the control panel for the circuit of FIG. 5.

Considering now the manner in which the counter 430 is stepped one position each time a partial program is completed, when a partial program is completed the artificial end-of-program signal on the conductor 406 is employed in the manner described above to reset the storage drum 300 to its first step and at the same time a reset pulse is developed on the conductor 422. This pulse which may have a width of 100 milliseconds, for example, is applied to an inverting amplifier 450 the output of which is connected to a predetermining counter step driver circuit 452. The circuit 452 supplies a ground to the output conductor 454 so that a circuit is completed from minus 28 volts through the normally closed contacts 456 of an ICR relay 458, the stepping coil 432, and the normally closed contacts 460 of the relay 458 to the grounded conductor 454. When the ground signal on the conductor 454 disappears at the end of the reset coil pulse supplied to the conductor 422, the coil 432 is de-energized and the switch arms 434 and 436 are stepped to the next position in the counter 430. At the same time the indicator associated with the switch level 436 advances one digit so that the number "1" will appear in the window 444 (FIG. 6). Accordingly, each time that the control signal on the drum 300 is encountered and the partial program is re-initiated, the counter 430 is stepped to the next step.

When the counter 430 has been moved a number of steps equal to the number to which the switch arm 440 has been set by successive depressions of the button 438, a ground is supplied by way of the common terminal 462, the switch arm 436, the switch arm 440, and the common terminal 464, to a diode 466 the cathode of which is connected to the output of the amplifier 402 and the input of the amplifier 404. When a ground signal is thus supplied to the input of the inverting amplifier 404, the output of this amplifier is prevented from thereafter going to ground so that the artificial end-of-program signal developed on the conductor 406 is thereafter disabled even though a control signal from the buffer storage 392 is applied to the conductor 400. Accordingly, the next time that the partial program is repeated and this control signal is sensed by one of the heads 350, no artificial end-of-program signal is produced and the manipulator apparatus continues through the remainder of the total program recorded on the drum 300.

Figure 5:
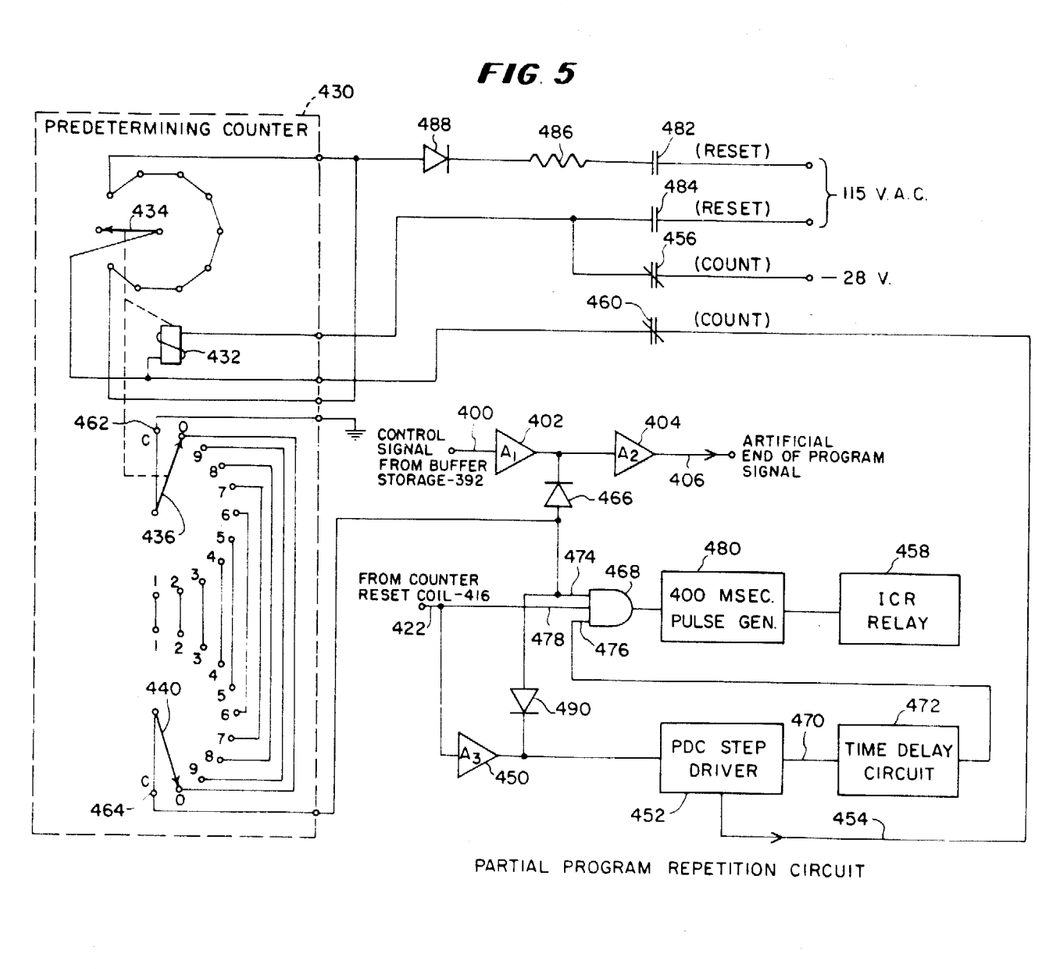
FIG. 5 is a schematic diagram showing the detailed circuitry of the partial program repetition circuit.

After this total program is completed, an end-of-program signal is produced in the normal manner and is supplied through the OR-gate 408 to the input of the AND-gate 410. When total coincidence occurs, the AND-gate 410 develops an output which is supplied to the control circuits 380 so that the drum 300 is reset to the first program step. This normal end-of-program signal also causes the rest driver 420 to develop a pulse on the conductor 422 while at the same time the electromechanical counter 412 is reset to zero. The reset pulse appearing on the conductor 422 is applied to one input 478 of a three input AND-gate 468 (FIG. 5). The ground signal developed at the common terminal 464 and supplied to the diode 466 in the manner described above, forms a second input 474 for the AND-gate 468. Also, the predetermining counter step driver circuit 452 is provided with a second output 470 which is supplied through a time delay circuit 472 to a third input 476 of the three input AND-gate 468. During periods before a ground signal is supplied to the input 474 of the AND-gate 468, the step driver circuit 452 produces a ground signal on the conductor 470 at all times except when a reset pulse is applied to the step driver circuit 452 from the amplifier 450. The output signal on the conductor 470 is thus of the opposite polarity from the signal produced on the conductor 454 which normally is at a minus value and rises to ground during the 100 millisecond reset pulse supplied from the amplifier 450. While the signal on the conductor 470 is normally an enabling signal to the AND-gate 468, this AND-gate does not produce an output until a ground signal is also supplied to the input 474 of this AND-gate and a reset pulse is supplied to the input 478 after the total program has been completed. When the AND-gate 468 does develop an output the resulting signal which is approximately 100 milliseconds long is supplied to a pulse generator or pulse stretcher 480 which produces a 400 millisecond pulse of sufficient duration to permit the predetermining counter 430 to be reset to zero. This 400 millisecond pulse energizes a relay 458 so that the contacts 482 and 484 thereof are closed, and the contacts 456 and 460 thereof are opened. When the contacts 482 and 484 are closed, an alternating current signal is supplied through the resistor 486 and the rectifier 488 to the coil 432 so that this coil is pulsed and released a number of times and each time it is released the switch arms 434 and 436 are moved one step until they are returned to the zero position shown in FIG. 5. When this occurs, the coil 432 is no longer supplied with pulsating current through the contacts 482 and 484. At the end of the 400 millisecond pulse developed by the generator 480, the relay 458 is again de-energized so that the contacts 482, 484 thereof are opened and the contacts 456 and 460 are closed. The counter 430 is thereafter prepared to count a predetermined number of repetitions of the partial program in the manner described in detail heretofore so that the manipulator apparatus goes through any number of successive cycles of a repetition of the partial program a predetermined number of times followed by a completion of the total program, all in the manner described heretofore.

The time delay circuit 472 is provided for the purpose of preventing a false actuation of the relay 458 before the partial program has been repeated the desired number of times. Thus, assuming that the switch arm 440 has been set to 6 indicating that the partial program should be repeated six times, at the end of the fifth completion of the partial program a reset pulse is developed on the conductor 422 which has the effect of producing a ground on the conductor 454 which will provide an energizing 28 volt signal for the coil 432 so that the arm 436 is moved to the 6th position. As soon as this occurs, a ground signal is immediately impressed on the input 474 of the AND-gate 468. However, this AND-gate is not supposed to provide an output until the partial program has been completed one more time. The time delay circuit 472 thus introduces a short time delay, in the order of 1 millisecond, which insures that the input 476 of the AND-gate 468 is not at ground until after the reset pulse has disappeared from the input 478. The entire program must thereafter be repeated once before another reset pulse is produced on the conductor 422 at which time the relay 458 is operated in the manner described heretofore.

The ground signal developed by the counter 430 after the partial program has been repeated a predetermined number of times is also applied through a diode 490 to the input of the step driver circuit 452. The diode 490 has the effect of holding the input of the step driver circuit 452 at ground even though a reset pulse is developed by the coil 422 at the end of the total program, as described heretofore. Accordingly, the input 476 of the AND-gate 468 remains open so that the reset pulse applied to the conductor 478 has the effect of producing an output from the AND-gate 468 which is used to energize the relay 458.

Figure 7:
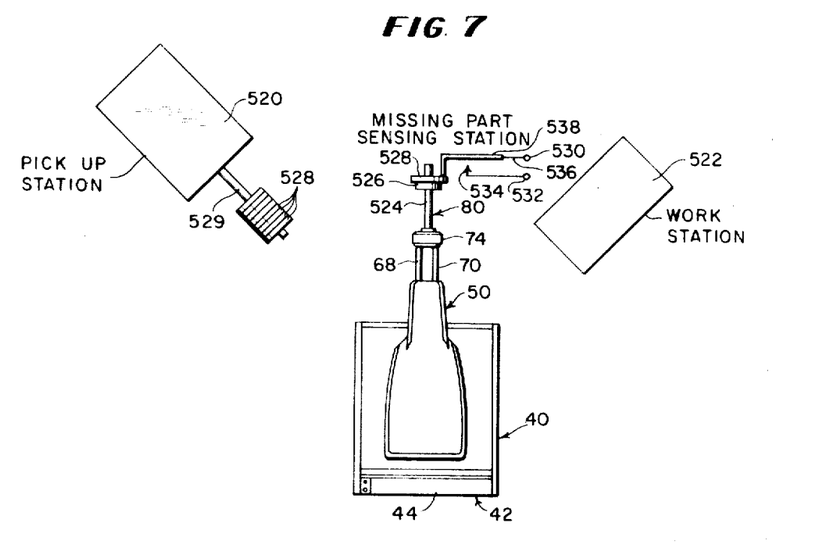
FIG. 7 is a plan view of an alternative embodiment of the invention in which the programmed manipulator apparatus operates in cooperation with an artificial end-of-program signal developed at a missing part sensing station.

Referring now to FIG. 7, a further embodiment of the invention is there illustrated whereby an artificial end-of-program signal is developed externally of the manipulator apparatus and is coordinated with a control signal on the drum 300 to cause the drum 300 to be reset to the first program step. More particularly, in FIG. 7 the manipulator apparatus 40 is provided with a rod 524 which is arranged sequentially to pick up different rings 528 positioned on a storage bar 529 at a pickup station 520. Since the arm picks up one of the rings 528 by moving the rod 524 into the center opening of the ring and lifting it off of the rod 529, it is possible that a ring may slip off of the rod 524 as the arm is moved to the work station 522.

In the embodiment of FIG. 7 the presence or absence of a ring 528 on the rod 524 is determined at an intermediate missing part sensing station and if no ring is present on the rod 524 at this station the total program is not repeated but instead the arm is returned to the station 520 to pick up another ring. More specifically, a sensing member 539 is flexibly mounted on a spring biasing portion 536 so that normally the member 538 engages a fixed contact 534 and a circuit is closed between the terminals 530 and 532. The manipulator arm is programmed during the teaching operation so that it will stop in front of the missing part sensing station and move toward the member 539. If a ring 528 is positioned on the rod 524 it will be moved against a fixed flange 526 provided in the middle of the rod 524 and as the arm moves closer the ring engages the member 538 and opens the circuit between the terminals 530, 532 when the manipulator arm is in the position shown in FIG. 7.

The terminal 530 is energized by a control signal from one of the spare channels of the buffer storage 392. More particularly, during the teaching operation the manipulator arm is moved to the position shown in FIG. 7 and this position is recorded on the drum 300. At the same time, i.e. for the same program step a control signal to be used in conjunction with missing part sensing is recorded in a spare channel of the drum 300. This control signal may be developed by closure of a switch, similar to the partial repetition switch 52 (FIG. 3), which places a ground signal on the drum 300 in one of the spare channels thereof. The arm is then moved to the remaining positions of the total program and each position is recorded as a succeeding step in the program.

During each operate cycle of the manipulator arm the arm is moved to the position shown in FIG. 7. As the arm moves to this position the above-described control signal is sensed and is supplied to the terminal 530. If no ring 528 is present on the rod 524 the circuit between the terminals 530, 532 remains closed and this control signal is supplied through the contacts 538, 534 and from the terminal 532 to the OR-gate 408 to act as an artificial end-of-program signal. When the arm completes its movement to the position shown in FIG. 7 and a total coincidence signal is applied to the AND-gate 410, the memory drum 300 is reset back to the first program step, as described in detail heretofore. However, if a ring 528 is present on the rod 524 the contacts 538, 534 are opened before the arm completes its movement to the position of FIG. 7. Under these conditions the artificial end-of-program signal is removed from the OR-gate 408 before a total coincidence signal is applied to the AND-gate 410 so that no output is developed by the AND-gate 410 and the drum 300 is not reset. The manipulator arm then moves through the remaining steps of the program and the normal end-of-program signal then resets the drum 300 back to the first program step.

Figure 8:
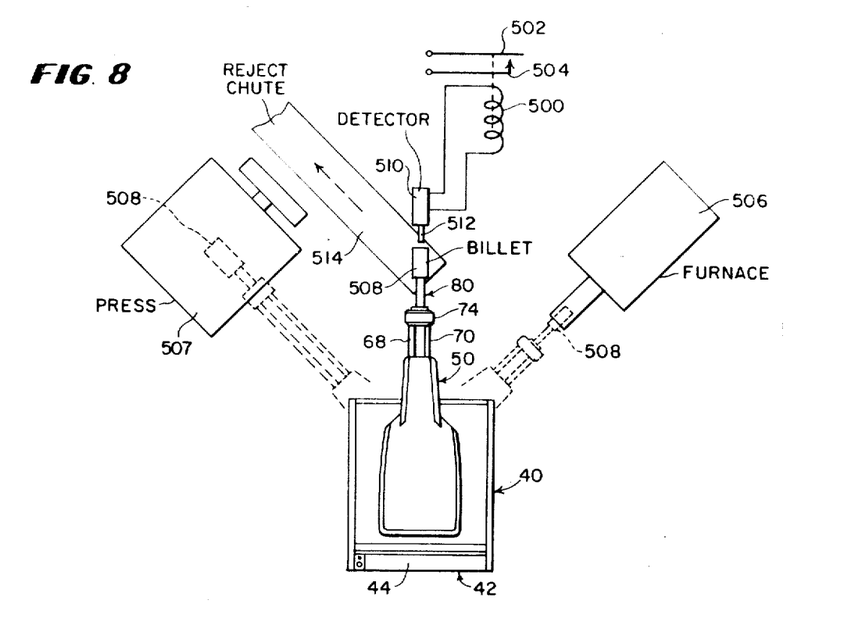
FIG. 8 is a plan view of another alternative embodiment of the invention in which the programmed manipulator apparatus operates in cooperation with an artificial end-of-program signal developed by a heat sensing device at a hot billet detecting station.

Referring now to FIG. 8, a further alternative embodiment of the invention is there illustrated whereby an artificial end-of-program signal is developed in response to the temperature of a part carried by the manipulator arm. More specifically, the manipulator apparatus is arranged to withdraw a hot billet 508 from a furnace 506 and move it to a position near a heat sensor or detector 510. If the billet 508 is at a temperature suitable for operation with a press 507 the manipulator arm is programmed to move the billet into the press to complete a stamping or forging operation. On the other hand, if the billet 508 is under temperature and is unsuitable for application to the press 507, the arm drops the billet 508 in a reject chute 514 and returns to the furnace 506 for another hot billet.

In order to reset the memory drum 300 to the first program step when the billet is below temperature, a control signal is recorded during the teaching operation in a spare channel of the memory drum 300 at the position of the manipulator arm at which the billet carried thereby is in proximity to the detector 510. When the arm is in such position the sensed control signal is derived from the buffer storage 392 and is supplied to the contact 502 of the relay 500. The relay 500 is energized only if the billet 508 is under temperature in which case the contacts 502, 504 of the relay 500 are closed. Under these conditions, the control signal is supplied through the series contacts 502, 504 to the OR-gate 408 as an artificial end-of-program signal. This artificial end-of-program signal acts in the same manner as the signal developed by the partial program repetition circuit of FIG. 5 to reset the memory drum 300 back to the first program step and to reset the counter 412 back to zero.

Since the fingers 80 of the manipulator arm must be open to grasp the next billet from the furnace 506, as soon as the drum 300 is reset to the first step the fingers 80 open and drop the rejected billet into the chute 514 before the arm has begun to move back to the furnace 506. On the other hand, if the billet is at the desired temperature the relay 500 is not energized, the contacts 502, 504 remain open so that the control signal sensed at that position of the arm is not sent on to the OR-gate 408, and the manipulator arm then moves on through the remaining steps of the total program.

While there have been described what are at present considered to be the preferred embodiments of the invention, it will be understood that various modifications may be made therein which are within the true spirit and scope of the invention as defined in the appended claims.

What is claimed as new and desired to be secured by Letters Patent of the United States is:

1. In a programmed manipulator apparatus, the combination of, a manipulator arm, means for moving said arm in a plurality of axes, a magnetic storage medium, means for recording a series of program steps on said medium, means for recording an end-of-program signal on said medium in association with the last step of said recorded program, means for recording a control signal in association with a particular step of said program, sensing means in operative relation to said medium for sequentially sensing said recorded program steps, said end-of-program signal and said control signal, means controlled by said sensing means for controlling said moving means to move said arm to positions corresponding to said recorded program steps, reset means responsive to sensing of said end-of-program signal for controlling said sensing means to respond to the first step of said recorded series of program steps, whereby said arm is moved repetitively through said series of programmed positions, means responsive to sensing of said control signal for developing an artificial end-of-program signal in response thereto, and means for supplying said artificial end-of-program signal to said reset means, thereby to return said arm to its initial position when only a predetermined portion of said program has been completed.

2. The combination of claim 1, wherein there is provided means for disabling said artificial end-of-program signal after said predetermined portion of said program has been performed a given number of times, thereby to permit said arm to thereafter perform the remaining portion of said program.

3. The combination of claim 2, wherein said artificial end-of-program signal developing means comprises a pair of series connected inverter stages, and said disabling means comprises means for applying a disabling signal to the input to said second inverter stage after said predetermined portion of said program has been completed said given number of times.

4. The combination of claim 1, wherein there is provided means for developing a total coincidence signal when movement of said arm in all of said plurality of axes has been completed for a step of said program, and said reset means is controlled jointly by said total coincidence signal and said artificial end-of-program signal to return said arm to said initial position.

5. In a programmed manipulator apparatus of the type having a predetermined total program for repetitively moving a manipulator arm through a series of positions to accomplish a predetermined task, a partial program repetition circuit comprising means for developing a control signal when said arm has been moved through only an initial portion of said programmed series of positions, means responsive to said control signal for developing an artificial end-of-program signal, and means utilizing said artificial end-of-program signal for causing said manipulator arm to be moved to the initial one of said positions without completing the remainder of said program.

6. The combination of claim 5, wherein said arm is movable in a plurality of axes, means for developing a total coincidence signal when movement of said arm has been completed in all of said axes at each programmed position of said arm, and means jointly responsive to said total coincidence signal and said artificial end-of-program signal controlling said arm moving means.

7. The combination of claim 5, wherein there is provided means for counting the number of times said arm is moved through said initial portion of said program, and means controlled by said counter means for disabling said artificial end-of-program signal developing means, thereby to permit said arm to move to the positions corresponding to said total program.

8. The combination of claim 5, wherein said manipulator arm is arranged to grip an article and move it successively to said series of positions, sensing means is provided at one of said series of positions to detect whether or not an article is being gripped by said arm at said one position, and means for developing said control signal only when said sensing means detects that an article is not being gripped by said arm at said one position.

9. The combination of claim 5, wherein said manipulator arm is provided with a holder at the end thereof which is adapted to grip an article so that the article is moved in a predetermined path when said arm is moved to said series of positions, sensing means is provided to determine whether or not an article is in said path when said arm is at one of said positions, and means for developing said control signal only when said sensing means indicates the absence of an article in said path when said arm is at said one position.

10. The combination of claim 5, wherein said manipulator arm is provided with a clamp at the end thereof which is adapted to grip an article so that the article is moved in a predetermined path when said arm is moved to said series of positions, sensing means adjacent said path for sensing a predetermined characteristic of the article when said arm is at one of said positions, and means controlled by said sensing means for developing said control signal only when said predetermined characteristic of an article is sensed by said sensing means.

11. In a programmed manipulator apparatus of the type having a predetermined program for repetitively causing a manipulator arm to pick up an article at an initial position and move it in a predetermined path from one position to another in a programmed series of positions, a control circuit including sensing means positioned adjacent said path for sensing a predetermined characteristic of the article, means for developing an artificial end-of-program signal only when said predetermined characteristic of an article is sensed by said sensing means, and means controlled by said artificial end-of-program signal for causing said manipulator arm to be moved to said initial position without moving to the remainder of said programmed series of positions.

12. The combination of claim 11, wherein said sensing means comprises means for developing a control signal when the temperature of an article sensed thereby is below a predetermined value, and said control signal is employed to develop said artificial end-of-program signal.

13. The combination of claim 11, wherein said sensing means comprises means for sensing the absence of an article when said arm is moved to a predetermined one of said positions.

14. The combination of claim 12, wherein a receptacle for below-temperature articles is provided, and means for controlling said manipulator arm to deposit a below-temperature article in said receptacle before said arm is returned to said initial position in response to said artificial end-of-program signal.

15. The combination of claim 11, wherein said manipulator arm is provided with article holding means on the end thereof, and said sensing means comprises means normally actuated by the presence of an article in said article holding means when said arm is moved to one of said positions other than said initial position.

* * * * *

PO-1050
(5/69)

UNITED STATES PATENT OFFICE
CERTIFICATE OF CORRECTION

Patent No. 3,654,613      Dated April 4, 1972

Inventor(s) Maurice J. Dunne, et al.

It is certified that error appears in the above-identified patent and that said Letters Patent are hereby corrected as shown below:

Column 13, line 52, after "signal" insert --for--

Signed and sealed this 24th day of October 1972.

(SEAL)
Attest:

EDWARD M. FLETCHER, JR.
Attesting Officer

ROBERT GOTTSCHALK
Commissioner of Patents